United States Patent
Kleve et al.

(10) Patent No.: US 9,460,571 B2
(45) Date of Patent: Oct. 4, 2016

(54) BACKUP KEY FOR MULTIPLE BACKUP KEY INTEGRATION INTO A MOBILE DEVICE CASE

(71) Applicant: Ford Global Technologies, LLC, Dearborn, MI (US)

(72) Inventors: Robert Bruce Kleve, Ann Arbor, MI (US); John Robert Van Wiemeersch, Novi, MI (US)

(73) Assignee: Ford Global Technologies, LLC, Deaborn, MI (US)

( * ) Notice: Subject to any disclaimer, the term of this patent is extended or adjusted under 35 U.S.C. 154(b) by 0 days.

(21) Appl. No.: 14/517,061

(22) Filed: Oct. 17, 2014

(65) Prior Publication Data

US 2016/0110938 A1   Apr. 21, 2016

(51) Int. Cl.

| G05B 1/01 | (2006.01) |
| G07C 9/00 | (2006.01) |
| H04M 1/11 | (2006.01) |
| E05B 19/00 | (2006.01) |
| A45C 11/32 | (2006.01) |
| A45C 11/00 | (2006.01) |

(52) U.S. Cl.
CPC ........... *G07C 9/00007* (2013.01); *A45C 11/00* (2013.01); *A45C 11/321* (2013.01); *A45C 11/326* (2013.01); *E05B 19/0017* (2013.01); *H04M 1/11* (2013.01); *A45C 2011/002* (2013.01)

(58) Field of Classification Search
CPC .......... G07C 9/00309; G07C 9/00111; G07C 2009/00769; G07C 9/00007; G07C 2009/00793; G07C 9/00103
USPC ....................................... 340/5.61
See application file for complete search history.

(56) References Cited

U.S. PATENT DOCUMENTS

| 2007/0156311 | A1 | 7/2007 | Elcock et al. |
| 2008/0048846 | A1 | 2/2008 | Nagai et al. |
| 2008/0190526 | A1* | 8/2008 | O'Shea ............ G06K 19/07327 150/147 |
| 2009/0243791 | A1* | 10/2009 | Partin .................... G08C 17/00 340/5.2 |
| 2010/0103036 | A1 | 4/2010 | Malone et al. |
| 2012/0172010 | A1 | 7/2012 | Oman et al. |
| 2012/0313768 | A1 | 12/2012 | Campbell et al. |
| 2013/0141212 | A1* | 6/2013 | Pickering ................. G05B 1/01 340/5.61 |
| 2013/0207778 | A1* | 8/2013 | Neafsey ............... H04M 1/7253 340/5.61 |

(Continued)

OTHER PUBLICATIONS

Indiegogo, Cavity Case Swallows Your Phone, Wallet, and Key Chain, http://indiegogo.com/project/cavity-case-swallows-your-phone-wallet-and-key, 2014.

*Primary Examiner* — Mark Blouin
(74) *Attorney, Agent, or Firm* — Frank MacKenzie; Brooks Kushman P.C.

(57) ABSTRACT

A backup key for a vehicle includes a blade extending along an axis within a first plane and a head, attached to the blade, extending along the axis and defining a slot along the axis for insertion of a torque assisting device. The slot may be configured to receive a coin. The slot may be configured such that the torque assisting device, when inserted into the slot, lies in a second plane that is generally perpendicular to the first plane. A case for a portable electronic device includes a housing configured to receive the portable electronic device and defining a plurality of receptacles for one or more backup keys. The case also includes a key fob circuit for wirelessly interfacing with a keyless entry system and a communication circuit that connects to the key fob circuit for coupling the portable electronic device and the keyless entry system.

18 Claims, 3 Drawing Sheets

(56) References Cited

U.S. PATENT DOCUMENTS

2013/0211623 A1 8/2013 Thompson et al.
2013/0249482 A1 9/2013 Iwanaga et al.
2014/0335897 A1 11/2014 Clem et al.

* cited by examiner

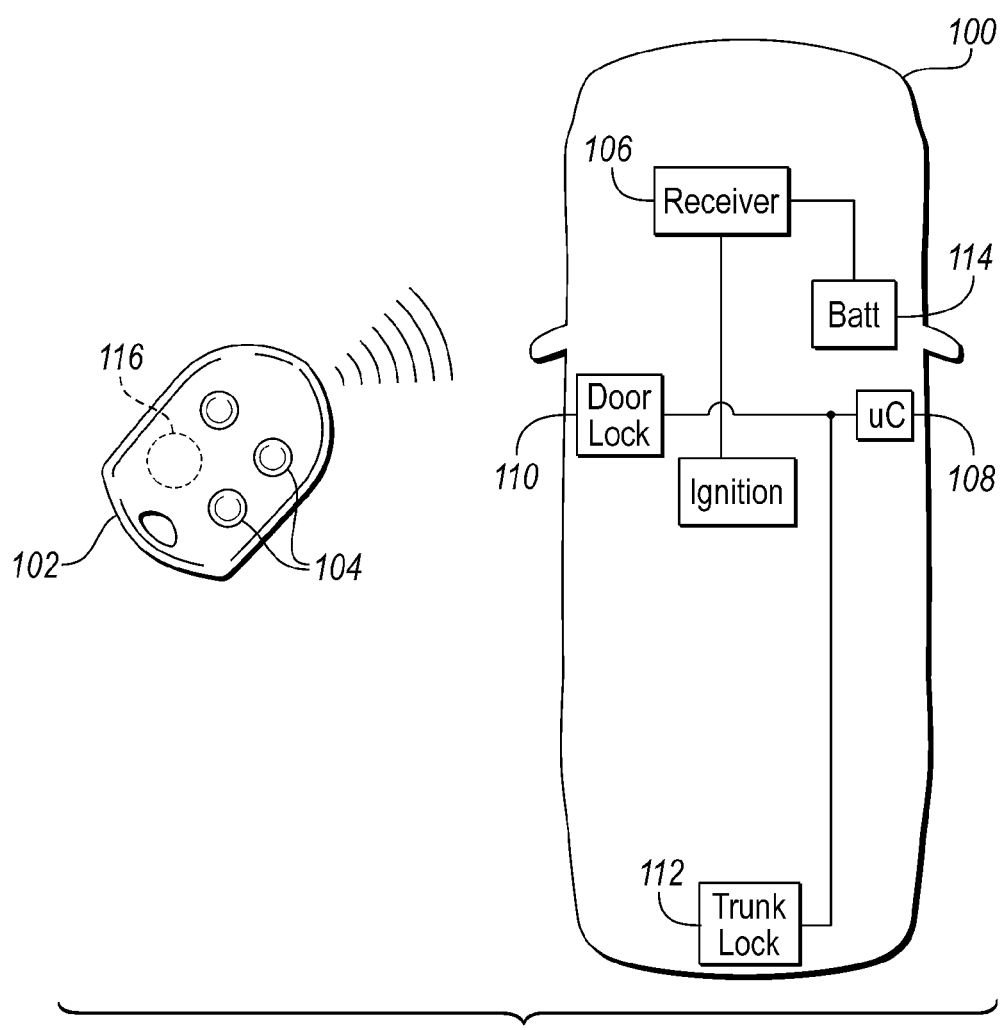
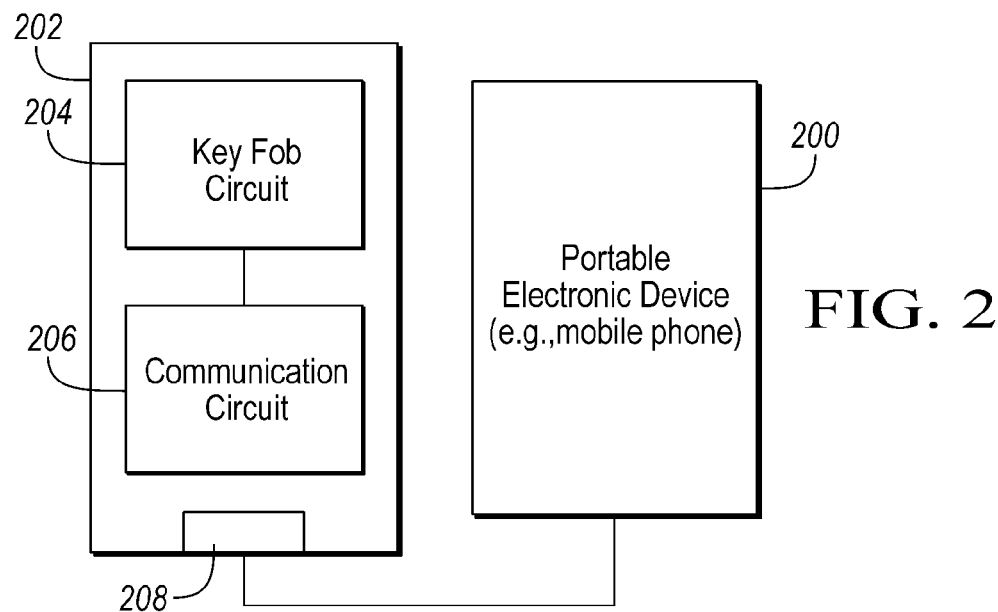
FIG. 1
FIG. 2

BACKUP KEY FOR MULTIPLE BACKUP KEY INTEGRATION INTO A MOBILE DEVICE CASE

TECHNICAL FIELD

This application generally relates to vehicle keyless entry systems.

BACKGROUND

Vehicles may include a keyless entry system for locking and unlocking doors of the vehicle. The keyless entry system includes a key fob that sends wireless signals to a controller in the vehicle. The controller receives the signals and locks or unlocks the doors accordingly. The key fob and the controller are powered by batteries. During a loss of battery power, the keyless entry system will no longer function. An alternative means of vehicle entry is required. The keyless entry system typically includes a traditional door lock mechanism that requires a key for entry. The key fob may include a backup key that can open the door lock mechanism during a loss of battery power. Such a system requires an operator to carry multiple key fobs for entry to multiple vehicles.

SUMMARY

A key for a vehicle includes a blade extending along an axis within a first plane and a head, attached to the blade, extending along the axis and defining a slot along the axis for insertion of a torque assisting device. The slot may be configured such that the torque assisting device, when inserted into the slot, lies in a second plane that is generally perpendicular to the first plane. The slot may be configured with a length and a width to accommodate a coin, such that the length is approximately a coin diameter and the width is approximately a coin width. A height of the head in the first plane may be less than twenty percent greater than a height of the blade in the first plane. A height of the head in the first plane and a height of the blade in the first plane may be approximately equal. A width of the head in a plane perpendicular to the first plane may be less than twenty percent greater than a width of the blade in the plane perpendicular to the first plane. A width of the head in a plane perpendicular to the first plane may be approximately equal to a width of the blade in the plane perpendicular to the first plane.

A case for a portable electronic device includes a housing configured to receive the portable electronic device and defining a plurality of receptacles for one or more backup keys. The case includes a key fob circuit integrated with the housing for wirelessly interfacing with a keyless entry system and a communication circuit integrated with the housing and connected to the key fob circuit for coupling the portable electronic device and the keyless entry system. The housing may further define a receptacle for a torque assisting device for the backup keys. The case may further include a port configured to connect the portable electronic device to the communication circuit. The housing may be configured such that the plurality of receptacles are concealed when the portable electronic device is received. The housing may be configured such that the plurality of receptacles are accessible when the portable electronic device is received. The case may further include a cover coupled with the housing. The keyless entry system may be part of a vehicle.

A mobile phone case includes a housing configured to receive a mobile phone and defining a plurality of receptacles for one or more vehicle backup keys. The case includes a key fob circuit integrated with the housing for wirelessly interfacing with a vehicle keyless entry system and a communication circuit integrated with the housing and connected to the key fob circuit for coupling the mobile phone and the vehicle keyless entry system. The housing may further define a receptacle for a torque assisting device for the vehicle backup keys. The mobile phone case may further include a port configured to connect the mobile phone to the communication circuit. The housing may be configured such that the plurality of receptacles are concealed when the mobile phone is received. The housing may be configured such that the plurality of receptacles are accessible while the mobile phone is received. The mobile phone case may further include a cover coupled with the housing.

BRIEF DESCRIPTION OF THE DRAWINGS

FIG. 1 is an overview of a keyless entry system using a key fob.

FIG. 2 is a block diagram of case for a portable electronic device that includes the functionality of the key fob.

DETAILED DESCRIPTION

Figure 3A:
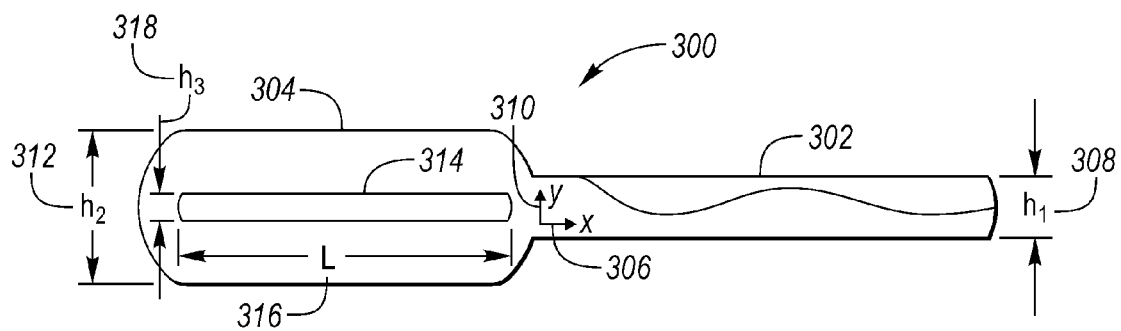
FIG. 3A is a side view of a possible backup key.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle 100 may include a keyless entry system for locking/unlocking vehicle access points and starting the vehicle 100. The keyless entry system may be controlled by a key fob 102 that is carried by an operator. The key fob 102 may include an antenna and electronic circuitry to transmit an electromagnetic signal wirelessly to the vehicle 100. The key fob circuitry and functions are well known in the prior art and the system described herein is not dependent on a specific implementation.

The key fob 102 may have one or more buttons 104 to trigger particular functions. For example, pressing one of the buttons 104 may cause one or more doors to lock. Pressing one of the buttons 104 may cause the doors to unlock. Pressing one of the buttons 104 may cause a trunk to open.

The vehicle 100 may include a receiver 106 for receiving wireless signals from the key fob 102. The receiver 106 may include an antenna and associated circuitry to convert the wireless signals to electrical signals. The receiver 106 may include a controller to convert the received signals into digital data. The receiver 106 may receive and decode the signals. The receiver 106 may forward the decoded signals to one or more controllers 108 within the vehicle 100 to perform the desired operations. For example, the receiver 106 may send commands to a door lock module 110 to lock or unlock the door. The receiver 106 may send commands to a trunk lock module 112 to open the trunk.

One shortcoming of the key fob operation is that the vehicle 100 must have power in order to operate. The receiver 106 and other devices within the vehicle 100 may also require power in order to operate. Devices in the vehicle 100 may receive power from an auxiliary battery 114 (e.g., 12 volt battery). In situations in which the auxiliary battery 114 is discharged below a predetermined threshold, electrical devices in the vehicle 100 may cease to operate. In addition, the key fob 102 may have a battery 116 that powers the key fob circuitry. When either the vehicle 100 or the key fob 102 have insufficient battery power, communication between the key fob 102 and the vehicle 100 cannot be established. Therefore, operations such as unlocking doors or starting the vehicle 100 cannot be achieved with the key fob 102.

A key fob 102 may be utilized to gain entry to the vehicle 100. Some vehicle applications may still require a physical key to start the vehicle 100. The key may be inserted into an ignition switch and rotated to select a desired operational mode. Other vehicle applications may not require a physical key to start the vehicle 100. The vehicle 100 may detect the presence of the key fob 102 within the vehicle 100 and allow an ignition cycle by pressing a start button without insertion of a physical key.

Applications using a key fob 102 that allow vehicle ignition without a physical key typically utilize a backup key. The backup key may be a separate key that must be carried by the operator. A disadvantage of a separate key is that the user may not be carrying the separate key when battery power is lost.

Many key fobs 102 have an integrated backup key. The integrated backup key may slide or fold out of the key fob 102 when needed. In some applications, a key may be fully removed from the key fob 102 when needed. An advantage of this configuration is that the backup key is always located with the key fob 102. When battery power is lost in the key fob 102 or the vehicle 100, the backup key may be used for vehicle entry. In order to minimize space for the backup key, the backup key may be designed to be as small as possible. A disadvantage of the small size is that the backup key may be difficult to rotate in the locking mechanism.

FIG. 2 depicts a case 202 for a portable electronic device 200 (e.g., mobile phone, MP3 player, tablet) that includes the functions of a key fob 102. The electronic circuitry of the key fob 102 may be integrated into a case 202 that cooperates with the portable electronic device 200 to operate the keyless entry system. The case 202 may interface with the portable electronic device 200 to receive commands and transfer status information. The electronic circuitry of the case 202 may also interface with the vehicle 100 to exchange data with the vehicle 100 for the keyless entry system. The case 202 is further configured to receive the portable electronic device 200. The case may protect the portable electronic device 200 from scratches and other damage. An additional benefit of this type of keyless entry system is that multiple vehicles 100 may be operated with the same case 202 and portable electronic device 200. The result is that the operator need only carry the portable electronic device 200 and the case 202. The need to carry multiple key fobs 102 is eliminated.

However, the loss of power issue still remains. When either of the vehicle 100 or the portable electronic device 200 loses battery power, the keyless entry system will not function. The need for the backup key still remains. Although a backup key may be provided as part of the key fob 102, no such provision is present for systems using a portable electronic device 200. Although the portable electronic device 200 based keyless entry system may replace several key fobs 102, it does not eliminate the need to carry the associated backup keys.

In a system using a portable electronic device 200 as part of the keyless entry system, it may be desirable to control multiple vehicles 100 with the same portable electronic device 200. For such a system, an effective method of carrying associated backup keys may be desired. One solution may be to construct a compatible case that can carry the associated backup keys. In order to efficiently store the backup keys, an improved backup key design may be helpful.

The backup key 300 consists of two main parts, the blade 302 and the head 304. The blade 302 is that portion of the key that is inserted into the locking mechanism. The head 304 is that part attached to the blade 302 to allow a torque to be applied for turning the blade 302 while it is in the locking mechanism. In a typical backup key design, a height of the head 304 is significantly larger than a height of the blade 302. This allows the operator to easily turn the key 300 when it is inserted in the locking mechanism. If the head height is not large enough, the operator may find it difficult to rotate the key 300.

Figure 3B:
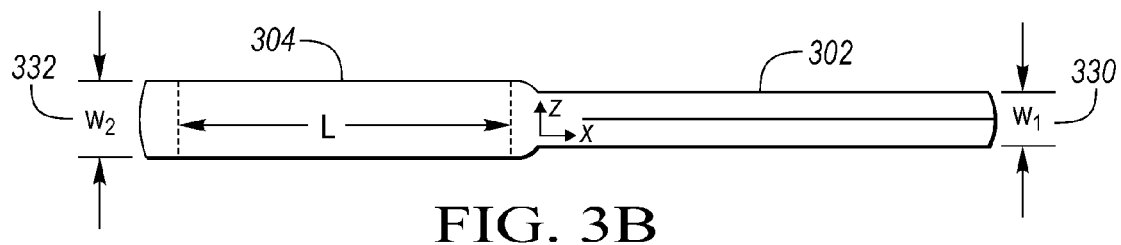
FIG. 3B is a top view of the possible backup key.

FIGS. 3A and 3B depict two views of an improved backup key 300. The backup key 300 is easily concealed in a key fob 102 or other device housing. The backup key 300 includes a blade 302 that extends along a first axis 306 (e.g., x-axis). The blade 302 may be cut according to the lock mechanism. The backup key 200 may be cut to match one lock mechanism on a first side of the blade 302 and cut to match another lock mechanism on a second side of the blade 302 which allows a single backup key to work with two different vehicles. The backup key 300 may also include a head 304 that is attached to the blade 302 and extends along the first axis 306.

The blade 302 may have height, $h_1$ 308, along a second axis 310 (e.g., y-axis) that is perpendicular to the first axis 306. The head 304 may have a height, $h_2$ 312, along the second axis 310. The head 304 may define a slot 314 of a predetermined length, L 316, along the first axis 306. The slot 314 may have a predetermined height, $h_3$ 318, along the second axis 310. The slot 314 may be configured such that a torque assisting device may be inserted through the slot 314 to allow the application of a torque to rotate the blade 302. The plane of the torque assisting device may be perpendicular to the plane defined by the first 306 and second 310 axes.

The height, $h_2$ 312, of the head 304 may be selected to be approximately the same as the height, $h_1$ 308, of the blade 302. In some applications, the height, $h_2$ 312, of the head 304 may be selected to be no more than a predetermined percentage greater than the height, $h_1$ 308, of the blade 302. For example, the predetermined percentage may be 20%.

The width, $w_2$ 332, of the head 304 may be selected to be approximately the same as the width, $w_1$ 330, of the blade 302. In some applications, the width, $w_2$ 332, of the head 304 may be selected to be no more than a predetermined percentage greater than the width, $w_1$ 330, of the blade 302. For example, the predetermined percentage may be 20%.

Figure 4:
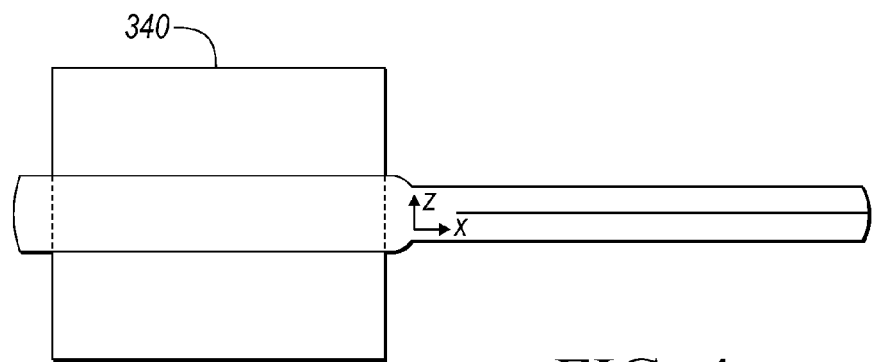
FIG. 4 is a top view of the possible backup key with a torque bar inserted.

FIG. 4 depicts a possible torque assisting device 340 that is inserted in the slot 314 of the backup key 300. The torque assisting device 340 may be configured to fit through the slot 314 such that portions of the torque assisting device extend on both sides of the head 304. Although a rectangular shaped torque assisting device 340 is depicted, other shapes are equally applicable.

Figure 5:
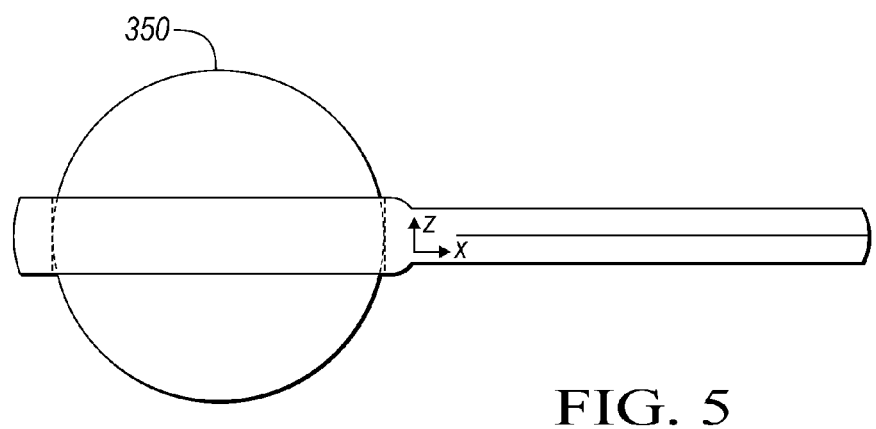
FIG. 5 is a top view of the possible backup key with a coin inserted.
Figure 6:
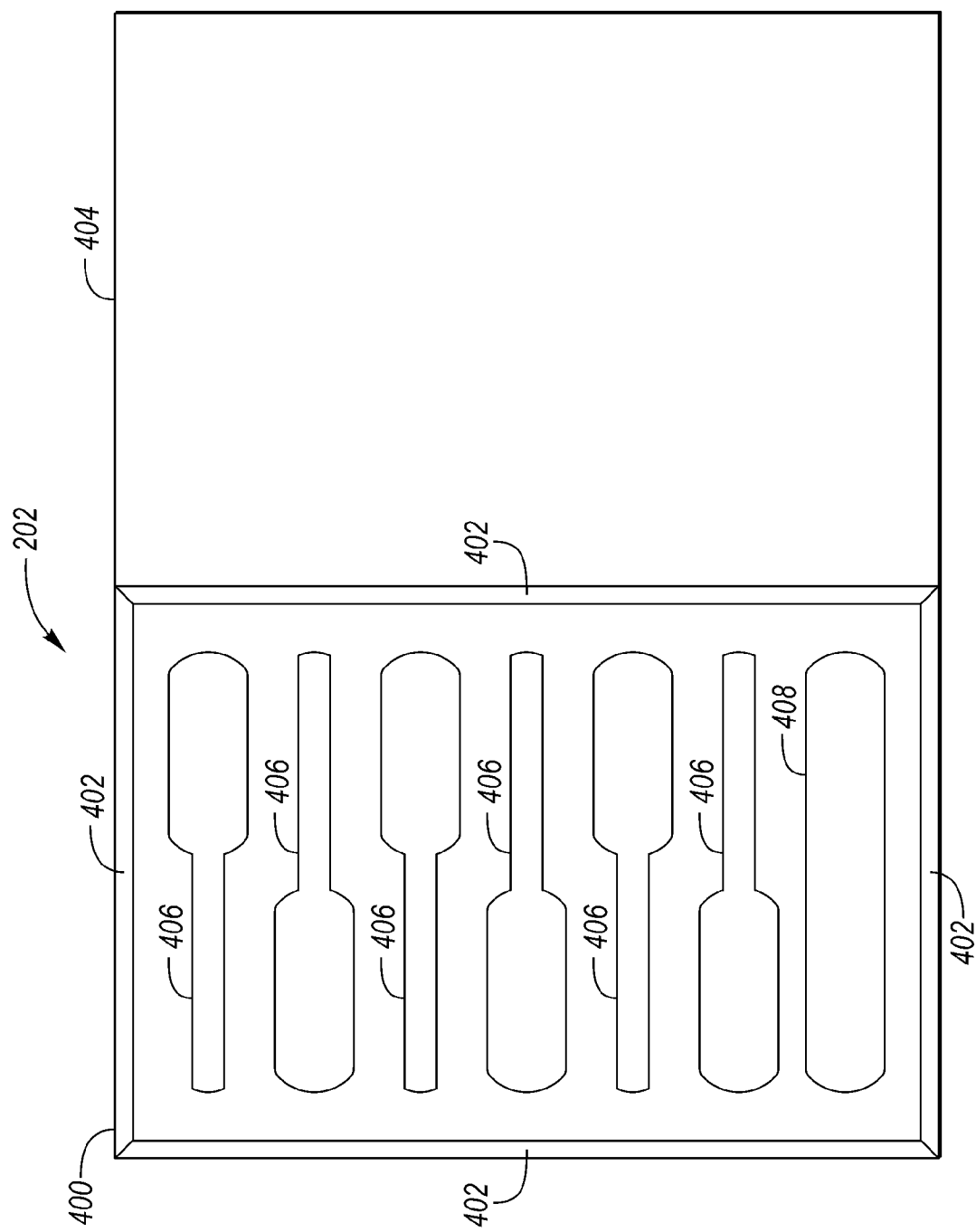
FIG. 6 is a possible implementation of a case for a portable electronic device that includes storage for backup keys for vehicle entry.

The slot 314 may be sized with a length, L 316, and height, $h_3$ 318, that are compatible with a coin. For example, the length, L 316, may be the diameter of a U.S. quarter and the height, $h_3$ 318, may be the width of a U.S. quarter. FIG. 5 depicts a coin 350 inserted into the slot 314.

As depicted in FIGS. 3 through 5, the slot is configured such that the torque assisting device, when inserted into the slot, lies in a second plane that is generally perpendicular to the first plane. However, the slot may also be configured such that the second plane formed by the torque assisting device is at some other angle relative to the first plane.

An operator may be able to operate several vehicles 100 using the portable electronic device 200. The operator may desire a place to store and carry the associated backup keys 300. Ideally, the operator could store the backup keys 300 along with the portable electronic device 200 such that all means of vehicle entry are in one location. One solution for this may be a case 202 that can hold the associated keys 300 along with the portable electronic device 200.

The case 202 may include a housing 400 for receiving the portable electronic device 200. The housing 400 may include a back panel and edges 402 that extend around sides of the portable electronic device 200. A cover 404 may be coupled to the housing 400 to allow the screen portion of the portable electronic device 200 to be covered. The cover 404 may be hingedly connected to the housing 400. Alternatively, the cover 404 may be a separate piece that slides over the housing 400 to cover the portable electronic device 200.

The housing 400 may include key receptacles 406, sized and shaped the same as the backup keys 300, for retaining a number of backup keys 300. The receptacles 406 may be shaped to allow sliding of the key 300 into the receptacle 406. The receptacles 406 may include a retention feature to retain the key 300 in the receptacle 406. The retention feature may include flexible receptacle sides that pinch the key 300 and a protrusion in the receptacle 406 that matches the slot 314 in the key 300. The housing 400 may also include a torque bar receptacle 408 for retaining a torque bar, sized to be inserted through the slot 314 in the backup keys 300. In use, the operator places backup keys 300 in the receptacles 406 to retain the backup keys 300. When the portable electronic device 200 is inserted into the housing 400, the receptacles 406, 408 may be concealed by the portable electronic device 200 until access is needed. In this manner, the operator may store a predetermined number of backup keys 300 for vehicles that they may own or operate. When the portable electronic device 200 or the vehicle 100 has no battery power, the portable electronic device 200 may be removed from the housing 400 to expose the receptacles 406 that hold the backup keys 300. The appropriate backup key 300 may be removed to unlock or start the vehicle 100.

The housing 400 may be configured such that the receptacles 406, 408 are concealed by the portable electronic device 200 when the device 200 is received by the housing 400. To access the receptacles 406, 408 may require that the portable electronic device 200 be removed from the housing 400. This configuration provides secure storage for the backup keys 300 as they are concealed and stored behind the portable electronic device 200.

The housing 400 may be configured such the receptacles 406, 408 are concealed by a separate panel. The panel may be opened and closed to access the receptacles 406, 408 stored in the housing 400. This configuration may provide easier access to the backup keys 300 without removing the portable electronic device 200.

The housing 400 may include openings on one or more sides of the housing 400. The openings may be sized to hold the backup key 300. One of the openings may be sized to hold a torque bar. The backup keys 300 may be slid into the openings and be contained within the opening. The housing 400 may include one or more covers that conceal the openings. The cover 404 may be configured in a similar manner to hold backup keys.

The case 202 may be configured to include the key fob 102 functionality and storage for multiple backup keys 300. A key fob circuit 204 may be integrated with the housing 400. The integration of the key fob circuit 204 provides a wireless interface for the vehicle keyless entry system. A communication circuit 206 may be integrated with the housing 400. The communication circuit 206 may be connected to the key fob circuit 204. The communication circuit 206 provides circuitry to interface the portable electronic device 200 to the key fob circuitry 204. The interconnection between the components provides a coupling between the portable electronic device 200 and the vehicle keyless entry system.

Many portable electronic devices 200 include a port for charging and communicating with other devices. The housing 400 may include an interface port 208 for plugging the portable electronic device 200 into the case 202. The port 208 may connect the signals from the portable electronic device 200 to the communication circuit 206 and the key fob circuitry 204. For example, the portable electronic device 200 may provide battery power for the electronics (e.g., 204 and 206) embedded within the case 202. In some applications, the case 202 may have a separate battery to power the circuitry. The communication circuit 206 may establish a wireless connection (e.g., wi-fi or Bluetooth) with the portable electronic device 200.

The portable electronic device 200 may be a mobile phone. An application may be implemented on the mobile phone that interfaces with the circuitry 204, 206 of the case 202 to operate the keyless entry system. The case 202 and the mobile phone provide the entire key fob functionality and protects against a loss of power in either the mobile phone or the vehicle. Multiple vehicles may be operated by a single mobile phone and case 202. The case 202 provides storage for the associated backup keys to protect for power loss in any of the multiple vehicles.

The backup key 300 may be constructed of non-ferrous materials. The backup key 300 may also be constructed of ferrous materials depending on placement within the case relative to the phone or key fob circuit antenna.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A key for a vehicle comprising:
a blade extending along an axis within a first plane; and
a head, attached to the blade, extending along the axis having a height in the first plane that is at most twenty percent greater than a height of the blade in the first plane to reduce key size and defining a slot having a length along the axis that is greater than a width perpendicular to the axis for insertion of a torque assisting device that, when inserted in the slot, lies in a second plane generally perpendicular to the first plane such that a force applied perpendicular to a surface of the torque assisting device that lies in the second plane creates a torque to rotate the key about the axis.

2. The key of claim 1 wherein the slot is configured with a length and a width to accommodate a coin, such that the length is approximately a coin diameter and the width is approximately a coin width.

3. The key of claim 1 wherein a height of the head in the first plane and a height of the blade in the first plane are approximately equal.

4. The key of claim 1 wherein a width of the head in a plane perpendicular to the first plane is less than twenty percent greater than a width of the blade in the plane perpendicular to the first plane.

5. The key of claim 1 wherein a width of the head in a plane perpendicular to the first plane is approximately equal to a width of the blade in the plane perpendicular to the first plane.

6. A case for a portable electronic device comprising:
a housing configured to receive the portable electronic device and defining a plurality of receptacles for concealing one or more backup keys;
a key fob circuit integrated with the housing for wirelessly interfacing with a vehicle keyless entry system; and
a communication circuit integrated with the housing and connected to the key fob circuit for coupling the portable electronic device and the vehicle keyless entry system.

7. The case of claim 6 wherein the housing further defines a receptacle for a torque assisting device for the backup keys.

8. The case of claim 6 further comprising a port configured to connect the portable electronic device to the communication circuit.

9. The case of claim 6 wherein the housing is configured such that the plurality of receptacles are concealed when the portable electronic device is received.

10. The case of claim 6 wherein the housing is configured such that the one or more backup keys are concealed and accessible when the portable electronic device is received.

11. The case of claim 6 further including a cover coupled with the housing.

12. The case of claim 6 wherein the keyless entry system is part of a vehicle.

13. A mobile phone case comprising:
a housing configured to receive a mobile phone and defining a plurality of receptacles for storing and concealing one or more vehicle backup keys;
a key fob circuit integrated with the housing for wirelessly interfacing with a vehicle keyless entry system; and
a communication circuit integrated with the housing and connected to the key fob circuit for coupling an associated mobile phone and the vehicle keyless entry system.

14. The mobile phone case of claim 13 wherein the housing further defines a receptacle for a torque assisting device for the vehicle backup keys.

15. The mobile phone case of claim 13 further comprising a port configured to connect the mobile phone to the communication circuit.

16. The mobile phone case of claim 13 wherein the housing is configured such that the plurality of receptacles are concealed when the mobile phone is received.

17. The mobile phone case of claim 13 wherein the housing is configured such that the plurality of receptacles are accessible while the mobile phone is received.

18. The mobile phone case of claim 13 further including a cover coupled with the housing.

* * * * *